United States Patent [19]

Rando

[11] Patent Number: 5,491,328
[45] Date of Patent: Feb. 13, 1996

[54] CHECKOUT COUNTER SCANNER HAVING MULTIPLE SCANNING SURFACES

[75] Inventor: Joseph F. Rando, Los Altos Hills, Calif.

[73] Assignee: Spectra-Physics Scanning Systems, Inc., Eugene, Oreg.

[21] Appl. No.: 188,164

[22] Filed: Jan. 26, 1994

Related U.S. Application Data

[60] Continuation-in-part of Ser. No. 108,112, Aug. 17, 1993, abandoned, which is a division of Ser. No. 764,527, Sep. 24, 1991, Pat. No. 5,256,864.

[51] Int. Cl.$^6$ ........................................ G06K 7/10
[52] U.S. Cl. ........................................ 235/462; 235/467
[58] Field of Search ........................................ 235/462, 467

[56] References Cited

U.S. PATENT DOCUMENTS

| | | | |
|---|---|---|---|
| 3,958,104 | 5/1976 | Zuckerman . | |
| 4,560,862 | 12/1985 | Eastman et al. | 235/467 |
| 4,587,407 | 5/1986 | Ahmed et al. | 235/467 |
| 4,652,732 | 3/1987 | Nickl | 235/462 |
| 4,799,164 | 1/1989 | Hellekson et al. | 235/467 |
| 4,839,507 | 6/1989 | May | 235/381 |
| 4,848,862 | 7/1989 | Yamazaki et al. . | |
| 4,867,257 | 9/1989 | Kuchler | 177/25.15 |
| 4,939,355 | 7/1990 | Rando et al. | 235/467 |
| 5,019,694 | 5/1991 | Collins, Jr. | 235/383 |
| 5,042,619 | 8/1991 | Kohno | 186/61 |
| 5,073,702 | 12/1991 | Schumacher | 235/467 |
| 5,081,364 | 1/1992 | Wike, Jr. | 250/555 |
| 5,128,520 | 7/1992 | Rando et al. | 235/375 |
| 5,206,491 | 4/1993 | Katoh et al. | 235/467 |
| 5,229,588 | 7/1993 | Detwiler et al. | 235/467 |
| 5,256,864 | 10/1993 | Rando et al. | 235/462 |
| 5,293,033 | 3/1994 | Yamashita . | |

FOREIGN PATENT DOCUMENTS

| | | |
|---|---|---|
| 899019 | 6/1984 | Belgium . |
| 2367320 | 5/1978 | France . |
| 63-109590 | 5/1988 | Japan . |
| 63-146198 | 6/1988 | Japan . |
| 63-192175 | 8/1988 | Japan . |
| 1-142072 | 9/1989 | Japan . |
| 1-144953 | 10/1989 | Japan . |
| 2-83686 | 3/1990 | Japan . |
| 2-83681 | 3/1990 | Japan . |
| 2-231688 | 9/1990 | Japan . |
| 3-103395 | 4/1991 | Japan . |
| 3-129583 | 6/1991 | Japan . |
| 3-167683 | 7/1991 | Japan . |
| 5-6484 | 1/1993 | Japan . |
| 7713933 | 6/1979 | Netherlands ........................... 235/467 |
| 1445100 | 8/1976 | United Kingdom . |

OTHER PUBLICATIONS

H. Ikeda et al., "Bar–Code Reading Technology", *Bulletin of the Precision Engineering Society*, vol. 54, No. 12, pp. 28–32 (1988).

T. Inagaki et al., "Applying Holograms to Pattern Input/Output Technology", *Fujitsu*, vol. 38, No. 2, pp. 137–142 (1987).

N. Nishida, "Optical System of the POS Scanner", *Machine Design*, vol. 29, No. 8, pp. 69–73 (1985) (with translation of FIG. 9).

Laser Scan 5000 Brochure, no date.
Orion #1 Brochure, no date.
Orion #2 Brochure, no date.
Freedom Brochure, no date.

*Primary Examiner*—John Shepperd
*Attorney, Agent, or Firm*—Lyon & Lyon

[57] ABSTRACT

A bar code scanning system such as for use in retail checkout in which the scanning system has a conveyor defining a first surface and a second surface disposed adjacent the first surface and arranged generally orthogonally thereto forming a scan volume therebetween; sets of pattern mirrors positioned adjacent the respective surfaces; and one or more laser beam sources associated with a rotating mirror polygon for producing scan patterns which are routed to the pattern mirrors and out through the respective surfaces into the scan volume.

17 Claims, 14 Drawing Sheets

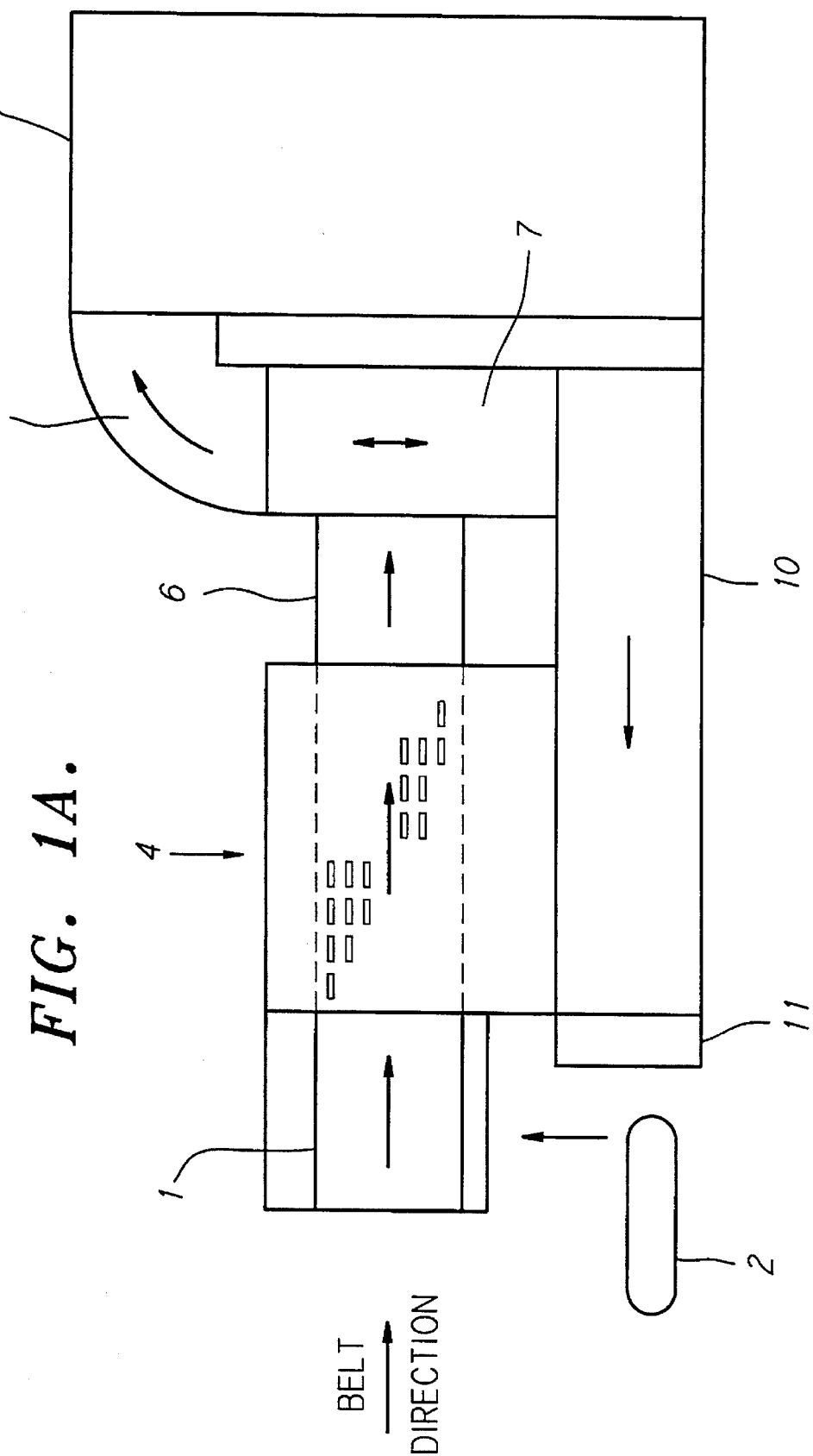

SIDE VIEW OF SCANNER SHOWING HEIGHT SENSING

CHECKOUT COUNTER SCANNER HAVING MULTIPLE SCANNING SURFACES

CONTINUING APPLICATION DATA

This application is a continuation-in-part of application Ser. No. 08/108,112 filed Aug. 17, 1993, now abandoned, which is a divisional of application Ser. No. 07/764,527 filed Sep. 24, 1991 now U.S. Pat. No. 5,256,864.

BACKGROUND OF THE INVENTION

The field of the present invention generally relates to bar code scanning apparatus. More particularly, the field of the present invention relates to a method and apparatus for preferentially aligning the surfaces of an item with respect to a predetermined locus of positions defining an optimal scanning path for decoding a bar code label and a system for providing display of alphanumeric data and/or pictorial images or the like corresponding to the item being scanned.

Bar code scanners are well known for scanning the universal product code ("UPC") and other types of bar codes on packages or containers, particularly in retail stores. Generally, in retail stores, bar code scanners are set up at check-out stands or are built into a horizontal check-out counter so that a laser beam is scanned up through a transparent window, defining a number of different scan lines. Normally, packages are placed by the customer on a counter, deck or conveyor. A check-out person then takes each package, visually locates the UPC or other bar code label on a surface of the package and moves the package through the laser's scanning area. One disadvantage of this technique is that the label must first be found and then the package must be held in a particular orientation in order to effect an accurate reading by the laser scanner decoding the bar code lines as the bar code moves through the scanning area. Misalignment of the bar code lines, or inadvertent movement of the package during the scanning operation can result in a misreading (or a non-read) of the bar code.

Conventional attempts to minimize or eliminate the participation of check-out personnel include a device such as described in U.S. Pat. No. 4,939,355. There, an item transported by a moving conveyor is subjected to a complex series of different scan patterns approaching from different sides of the item. This scanning requires a large depth of field for the scan beams. The item to be scanned is placed in any orientation on the scan belt. A scanning means generates scan lines in an X configuration for reading the object in virtually any orientation. Due to the infinite variations in product sizes, irregularities of shapes and differing locations of a bar code label on an item, conventional scanning methods too frequently fail to achieve a first successful read on the pass of the item scanned, which requires rescanning to obtain the data associated with the bar code label being decoded.

Additionally, conventional methods for bar code scanning provide the customer with an itemized listing, such as receipt list, of the items which were scanned. There is a time lag between the time that the items are scanned and the point at which the customer receives the itemized list. This time lag often results in a lack of customer recognition of the items and their associated prices. The lack of recognition inherent in a list, disassociated from the items as they are moving on a scanning path, may lead to customer misunderstanding and may slow down the check-out process at a retail point of sale.

Another problem associated with conventional automated scanning systems involves security. For example, in the method described in U.S. Pat. No. 4,676,343, the customer must look for each label and then scans the item in the conventional manner. The item is then placed on a conveyor belt for transport and item verification. This system is very slow because of the inexperience of the customer and because of the difficulty in finding the label. This method also does not provide adequate security because the customer can place a higher priced similar item on the belt.

An additional problem in a conventional automated scanning system is a substantial number of "no reads" when an item is not positioned properly in the scanning region. When an item has an irregularly shaped surface, the rate of no-reads tends to be higher for conventional automatic scanning systems.

SUMMARY OF THE INVENTION

One embodiment of the present invention comprises an apparatus for achieving an improved through-put such as may be used in a checker-less checkout for scanning a bar code label on two surfaces of an item moving along an item path and through a scanning region. According to a preferred embodiment, a transporter moves an item along an item path and through a scanning region wherein the focal plane of a laser scanner is automatically oriented in optimal coplanar alignment with a surface of the item being scanned. The transporter may comprise a first belt having a surface for moving the item along the item path and a second belt disposed substantially at 90° to the first belt and moving in a parallel direction. One of the belts is preferably tilted at least 30° to the horizontal so that an item placed on either belt will have at least two surfaces stably registered by gravity, one surface to each supporting surface of the belts.

Another embodiment of the present invention includes a means for providing a concurrently moving display of data relating to the item being scanned. That is, a visual display of data relating to the item being scanned moves along a belt or other display means in proximity with the item along the item path. This display greatly enhances customer recognition and association of pricing data and other information (such as graphical or pictorial data) with an item as it moves along the item path. One embodiment of a moving display means includes a continuous belt of film, substantially coextensive with the transport means, wherein the film comprises a material capable of selectively changing color or optical transmission upon exposure to a source of synergistic stimulation such as the application of heat in a specific pattern, or an electric field.

In the heat sensitive film embodiment, the visual display will persist as long as the elevated temperature exists, without the need for using electronic refresh memory techniques. In the time it takes the heated belt section to return to its starting point, the belt temperature returns to ambient temperature and is ready to receive a new image. The image endures for a predetermined time and simply fades away as the material cools.

The display means also may comprise a liquid crystal display which changes appearance upon the application of an applied electric field; in this event, the image will not need to be refreshed using well known memory techniques until new information replaces old information. Such liquid crystal material is now commercially available as a thin belt. This product is manufactured by Raychem, Optical Shutters and Taliq Corporations. A special long time constant liquid crystal formulation is preferred. The image on the display means is not limited to alphanumeric representations but may also include any visual display capable of conveying discrimination and meaning. For example, if the item scanned is a bottle of ketchup, a graphical representation of the bottle may appear on the display and the user may readily correlate the item on the conveyor with the graphical representation on the display.

The movement of the display may be accomplished mechanically by actual movement of the display medium or electronically with the display medium being stationary and the image being moved across the medium.

BRIEF DESCRIPTION OF THE DRAWINGS

FIG. 1A is a schematic drawing showing how unread items may be returned to a customer for rescanning or manual check-out;

FIG. 7A is a perspective view showing an apparatus for generating a visual display image on a thermochromic material or the like;

DETAILED DESCRIPTION OF THE PREFERRED EMBODIMENTS

Figure 1:
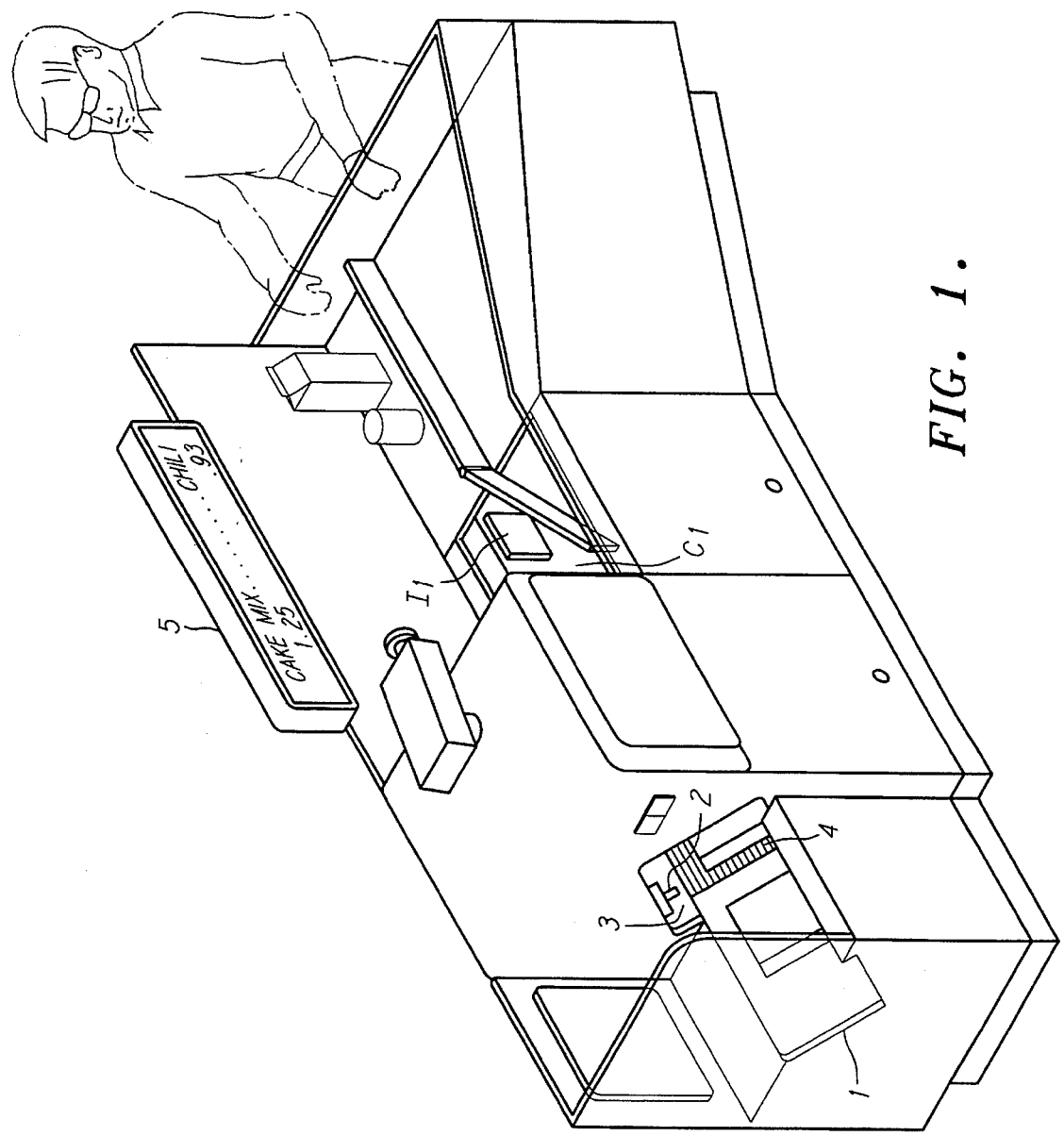
FIG. 1 is a perspective view of an overall system.

The preferred embodiments will now be described with respect to the drawings. FIG. 1 shows a system for preferentially aligning and registering at least two surfaces of a package for optimally scanning a bar code label located on those surfaces. In the automatic scanning system, as shown in FIG. 1, items are placed on a transport means comprising a belt 1 for scanning one item at a time. One or more item gates 2 may be provided for sensing the beginning and end of each item. The items are conveyed by the belt 1 into a scanning region 4. An aperture 3 initially provides a means for achieving a general preferential orientation of an item with respect to height and width so that the item will be generally positioned on the belt 1 for scanning as will be explained. A visual display 5 of data relating to the item being scanned moves along a belt or other display means concurrently and in proximity with the item. This visual display enhances customer and security personnel recognition and association of pricing data and other information with the item as it moves along the item path through the scanning region. This display may also be used to instruct the customer and to verify pricing for each item.

The present inventors have recognized it may be desirable to have a system for completely stabilizing an item as it is moved along an item path through a scanning region. It may also be desirable to register two surfaces of an item to be scanned such that the bar code labels are preferentially positioned in a predetermined, optimal alignment with the scanning lines of a laser bar code scanner. At least two surfaces of a package to be scanned are located such that the two surfaces are stably registered with respect to a predetermined locus of positions which define an optimal scanning path for a bar code scanner.

A bar code label may be optimally scanned to increase the first pass read rate thereby facilitating the checking out of items at a point of sale such as a grocery market check-out area. In this regard, a system may optimally scan bar code labels on surfaces of an item which are stabilized with respect to an optimal scanning path and which limits the number of directions from which the surfaces of an item are scanned. This system advantageously would simplify the scanning process and increase the speed and accuracy of the scanning.

FIG. 1A is a top view of an arrangement wherein conveyor belts can be used to return items with unread labels to the customer. In normal operation, the customer places the items on the input belt 1. The presence and size of the item in one dimension are measured by the item gate 2 or other item gates along the belt 1. Next, the item moves into the scanning region 4 where the scanned laser beams attempt to read the bar code label. If the item label is read, a read signal is sent to the belt control system, (not shown) in accordance with well-known techniques. After the item has passed scanning region 4, a section of two belts 6 can rotate so as to form a joint with a normal single horizontal conveyor belt. A conveyor belt 7 is directed perpendicular to the rotated conveyor belt 6. This belt can direct the items which were correctly read to the storage area 8. A downward slopping ramp 9 conducts the items into the storage area 8. By reversing the direction belt 7, items which are not read can be sent back to the customer on another belt 10. These unread items are collected on a shelf 11 at the end of the return belt 10. The customer can then place the unread item on the input belt 1 again or carry the item to the pay station where the attendant can read the label in a conventional manner.

Figure 2:
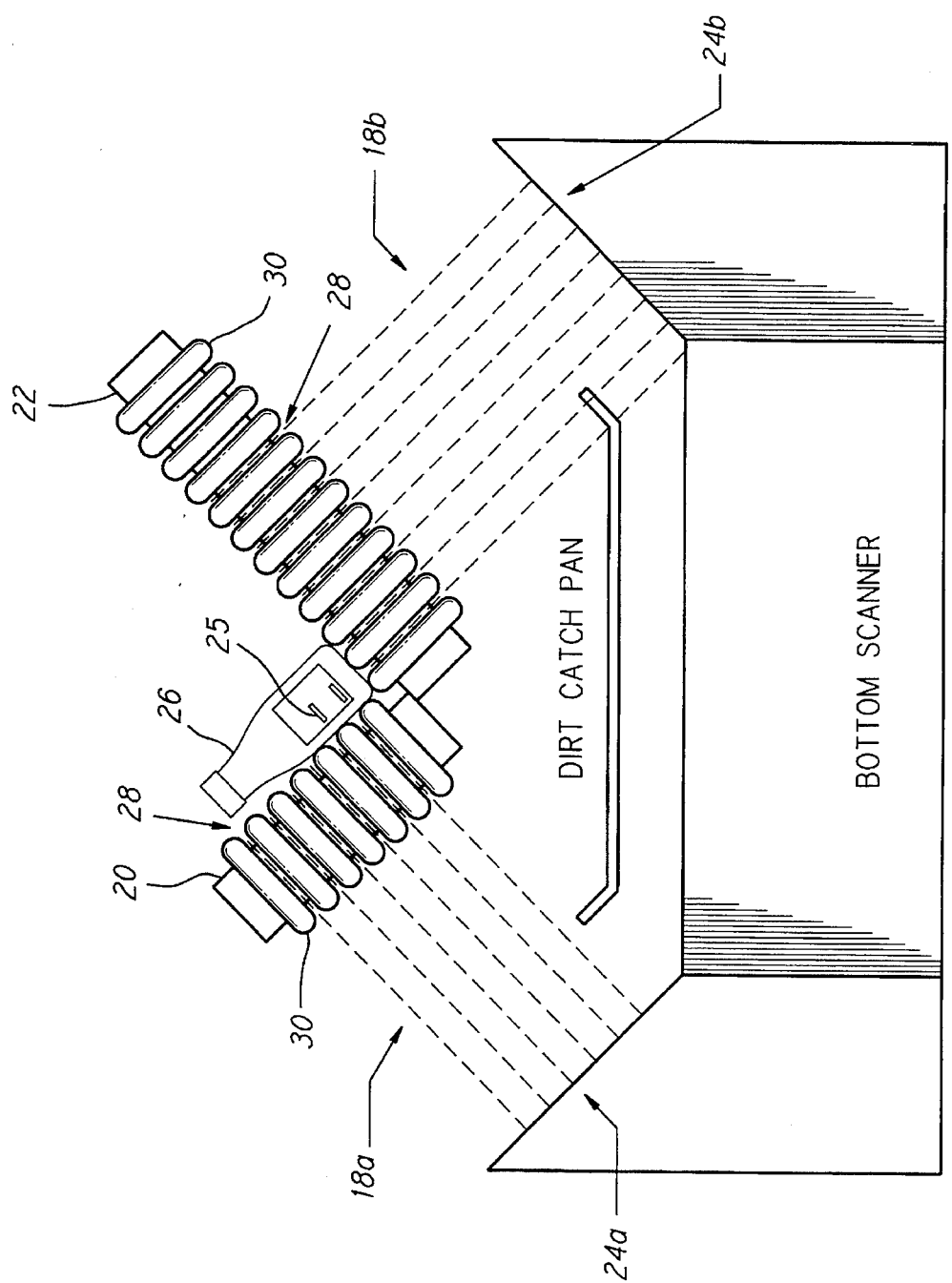
FIG. 2 is a front view showing scanning through the belts of the system.

As shown in FIG. 2, the system facilitates the check-out of groceries or other items traveling along an item path and through a scanning region defined by scanning lines 18a, 18b. A transport means preferably comprises conveyor belts 20, 22 which orient two surfaces of a package in a preferential alignment so that a bar code label is registered in an optimal position for reading by a scanning bar code reader as shown generally at 24a and 24b in FIG. 2. A package to be read rests in a trough formed by the two conveyor belts 20 and 22 which are preferably aligned at 90° to one another. This alignment locates two surfaces of most packages and registers a respective surface of a package to each belt. Further, the orthogonal belt combination 20, 22 is tipped at some angle such that the items contact a surface of the belt 22 and slide due to the force of gravity against the other belt. This configuration enables an automatic preferential alignment of two surfaces of the item to be scanned against respective contacting surfaces of the belts 20 and 22. Because the belts 20 and 22 move in unison, the two surfaces of the item are substantially registered in an invariant alignment with respect to a scanning means.

Each face of the scanned volume is scanned separately from a separate direction as well. The belts limit the scanning of a bar code label on a belt-contact surface to only two scan directions; along the belt and perpendicular to it. A laser scanning means generates a series of parallel scanning lines which describe a scanning volume in a first direction perpendicular to the first belt. Because the belts are aligned at 90° to each other, at least two generally orthogonally opposed surfaces of the item to be scanned are registered stably by gravity, or by vibration assisted sliding, against a respective surface of the belt. This automatically aligns the scanning bars of the bar code on a first surface of the object with the focal plane of scanning lines which scan the object in a first direction perpendicular to the belt. The scanning means produces a series of scanning lines in a second scanning direction perpendicular to the second belt and thus to the second surface of the item registered to the second belt. Thus, the scanning bars of the bar code label of the second surface of the item are also automatically aligned in a coplanar orientation with the focal planes of the scanning lines produced in the second direction.

In the foregoing double tilted belt design, the items are automatically aligned in an optimal direction for the scanning bars which generally run parallel to the package or item edges. Because of the motion of the belt, a single vertical scan line and an array of horizontal scan lines are sufficient to read a bar code label on either the first or second surfaces of the belt. This aspect of the present invention achieves a first pass read rate of bar code labels greater than 95%. Such a first pass read rate was heretofore unlikely due to the limitations of conventional scanning devices mentioned above.

As shown in FIG. 2, the two surfaces of an item 26 are oriented and located in a predetermined plane for reading with the scanning lines 18a and 18b of a scanning means 24a and 24b such as a bar code scanner. This orientation enables the items to be stabilized in accordance with a predetermined, optimal plane, coplanar with a scanning plane for reading the bar code label. This configuration of two conveyor belts moving in concert may be used in manned check-out systems or in partially or fully automated check-out systems.

In accordance with the embodiment as shown in FIG. 2, bar code labels 25 on the surfaces of an item 26 which are in contact or in close proximity with belts 20 and 22 are scanned through a series of slot means disposed in belts 20 and 22. The slot means define slot specific scanning lines at an optimal plane with respect to the item surfaces registered to the belts. It will be appreciated that the scanning lines 18a and 18b scan the item in accordance with a predetermined locus of positions which also define an optimal scanning path or focal plane for sensing and decoding a bar code label.

In a preferred embodiment, as shown in FIG. 2, at least two scanner means 24 are disposed for scanning a separate surface of the item 26 through the spaces 28 in the belts 22 and 20 respectively. The belts 20 and 22 limit the scanning to only two scan directions as shown. A first scanning means 24a is disposed substantially orthogonally with respect to the first belt 20 for scanning a corresponding surface of the item 26 disposed on the belt 20. A second scanning means 24b is disposed orthogonally with respect to the second belt 22 for scanning a corresponding surface of an item 26 registered to belt 22.

In another embodiment, the scanning is accomplished through slot means or spaces 28 disposed in the belt in recurrent rows parallel to the direction of the belt for defining a focal scanning plane coplanar with item surfaces which are registered to the belts. The scanning lines 18 defined by the slot means 28 may be optimally aligned with the parallel bars of a bar code label disposed on either of the major surfaces of item 26 which are registered to belts 20 and 22, respectively.

Figure 3:
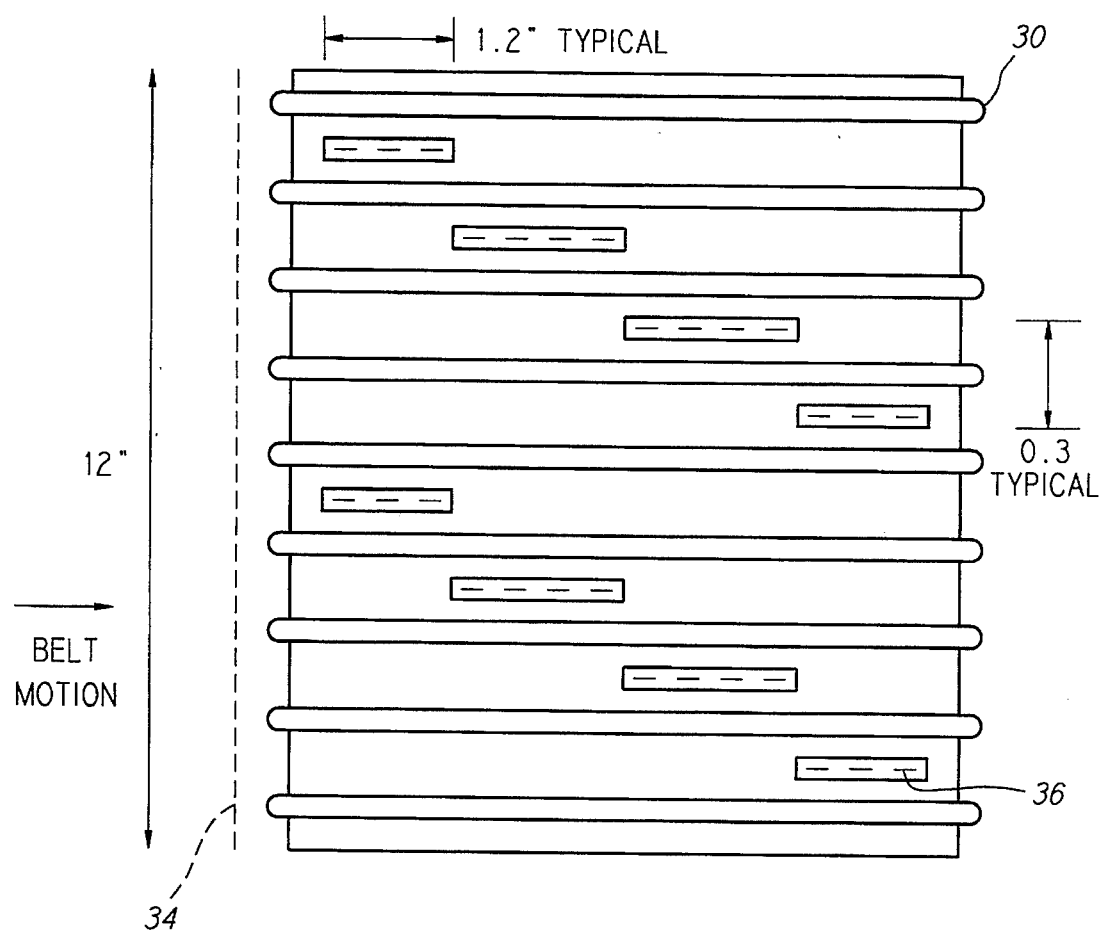
FIG. 3 is a top view of the preferred spacing of slots between O-rings for admitting scanning lines.

Referring to FIG. 3, in another embodiment, scanning is done through a series of slot means or spaces 28 disposed in the belts 20 and 22, respectively, for defining an optimal locus of positions for scanning lines at the item surface. In a preferred embodiment, slot means 28 comprise a series of O-rings or a plurality of thin flat belts arranged in recurrent rows parallel to the direction of the belts for defining scanning lines at the item surface parallel to the belt. As shown in FIG. 3, scan slots and scan lines 36 are parallel to the O-ring or thin flat belt. One or more scanning lines 34 may be provided perpendicular to the belt. In the instance where both belts are tilted from the horizontal and vertical as in FIG. 2, an item 26 will be preferentially aligned (by gravitational action) in an optimal direction for scanning the bars of a bar code label 25 which run parallel to the package edges. Because of the motion of the belt, a single vertical line 34 and an array of horizontal scanning lines 36 are sufficient.

The scanning lines 34 and 36 may be defined by either O-rings or by slots in a belt or by a belt including a series of smaller parallel belts or a plurality of thin flat belts for creating a desired spacing for admitting scanning lines. FIG. 3 shows a pattern for the example of a 12 inch wide section of belt 20 or 22. In a preferred embodiment, there are a total of 40 horizontal lines on a 0.3 inch spacing. This feature of the invention enables the scanning lines 18 to be automatically aligned in an optimal focal plane with the scanning bars of a bar code label 25 on both surfaces of an item 26 which are registered to the belts 20 and 22. Other belt widths, belt spacing and scan slot lengths can be chosen without departing from the principles of the invention.

Alternatively, scanning may be carried out through a transparent plate of material such as scratch resistant glass. The transparent plate is disposed such that the O-rings or thin belts move the item across the plates. The focal plane of the scanning lines is coplanar with the glass plate and with the lines of the item bar code label as it moves across the plate. Scanning also may be done through a transparent scratch resistant belt, without the need for O-rings or slots.

A decoding means (not shown) for decoding the scattered light signal generated by the scanning means is provided in accordance with well known techniques. The decoding means includes a microprocessor for producing an output signal representative of the data derived from the scanning of the bar code label in accordance with well known techniques.

Figure 4A:
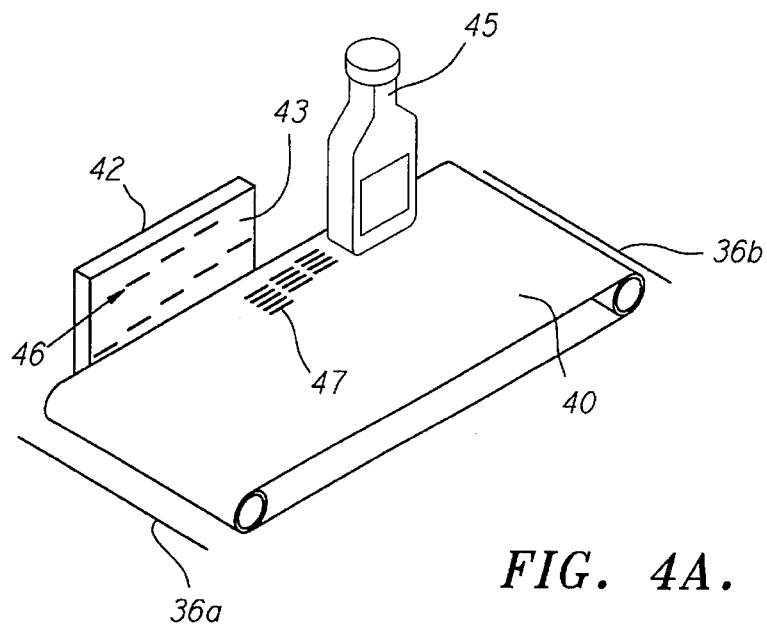
FIG. 4A is a perspective view of another embodiment of the present invention showing a stationary guide means.
Figure 4B:
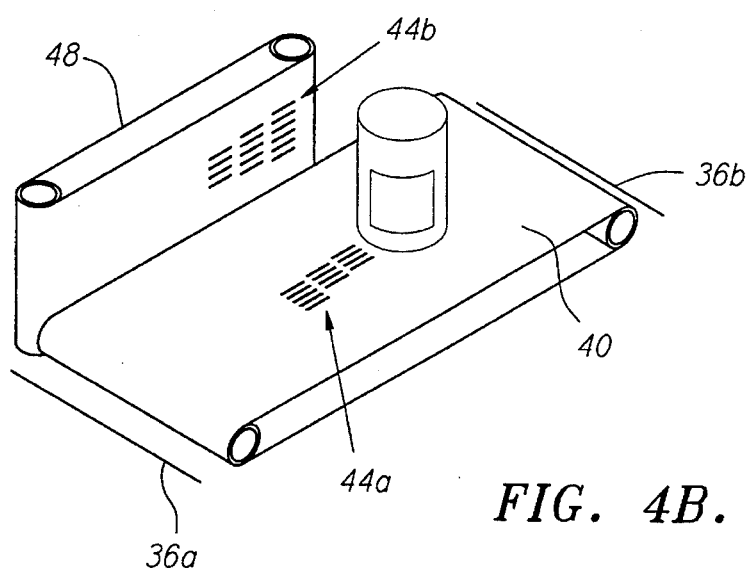
FIG. 4B is a perspective view of another embodiment of the present invention using a moving platen.

Referring to FIGS. 4A and 4B, an alternate embodiment of the present invention provides a means for automatically orienting an item and aligning at least two surfaces with respect to a predetermined locus of positions for defining an optimal scanning path for decoding a bar code label. In FIG. 4A, a means for preferentially aligning an item surface along a moving belt 40 is provided by a platen 42. The platen 42 has a guide surface 43 disposed at 90° with respect to a moving belt 40. The belt and platen may be tipped from the horizontal and vertical position to automatically align a surface of the item against the platen 42 and belt 40 by gravity. Also, vibration assisted registration of surfaces of the item may be employed to stabilize a planar surface of the item to a respective belt. Alternatively, a customer may place a surface of the item against the platen 42 and thereby preferentially align at least two surfaces of the item to be scanned. One surface of an item 45 is automatically oriented, being substantially invariantly stabilized and aligned by gravity for scanning against the belt 40. The other surface is aligned against the platen 42 by gravity when the scanned surfaces are tilted. The guide surface 43 of the platen 42 is preferably comprised of a slick material having a low coefficient of friction such as teflon. A series of scan lines 46, 47 are scanned through the platen 42 and through the belt 40, respectively. The scan lines 46, 47 run parallel to the package edges and parallel to the direction of the belt. Accordingly, the scanning lines are preferentially aligned in an optimal focal plane coplanar with the bars of the bar code label which also run parallel to the package edges. A single scan line 36a or 36b is arranged to scan perpendicular to belt motion through a narrow slot at either belt end 40.

As shown in FIG. 4B, a moving platen 48 may be provided which travels in concert with the belt 40 and moves the item along the item path in a predetermined, optimal alignment with the scanning lines of a bar code scanner. A series of spaces or through-slots 44b also may be provided in the moving platen 48 similar to the slots 44a in the belt 40 for optimally scanning a bar code label of the item adjacent thereto.

The bar and space elements of a bar code label of a first surface of the item adjacent the guide means are automatically positioned in an optimal coplanar relation with the scanning lines of a bar code scanner which scans the bar code labels through slots or spaces in the supporting platen. Similarly, the bar and space elements of a bar code label on the surface of the item adjacent the orthogonal supporting transport belt are automatically positioned in an optimum coplanar relation with the scanning lines produced by the bar code scanner which scans the bar code label from a perpendicular direction through slots or spaces in the supporting transport belt.

Figure 4C:
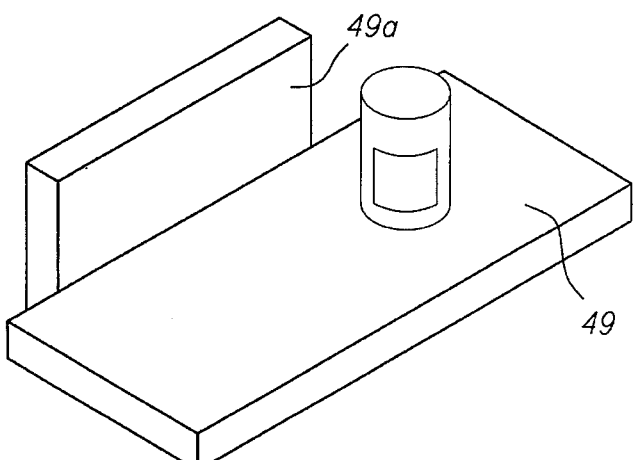
FIG. 4C is perspective view of another embodiment of the present invention using two plates of transparent material.

In an alternate embodiment of FIG. 4C, two plates 49, 49a of transparent material, preferably scratch resistant glass, are disposed at substantially 90 degrees to one another. Together, the plates 49, 49a form a trough which defines an item path for preferentially aligning two faces of an item in a predetermined position, coplanar with the respective focal planes of scanning lines produced by a scanning means. Any convenient motive means, such as transport belts or vibration assisted sliding is provided for moving an item along the path formed by the glass plates 49, 49a. Scanning is done through the glass plates. The focal plane of the scanning lines being coplanar with the plane of the glass. In this way, a face of the item is stably registered against a corresponding plate such that the lines of one bar code label are preferentially aligned in a coplanar orientation with the scanning lines from a bar code scanner, resulting in a mechanically simplified scanning means. Alternately, a transparent scratch resistant belt can be used as the supporting medium, and scanning can be done through the transparent belt.

Figure 5A:
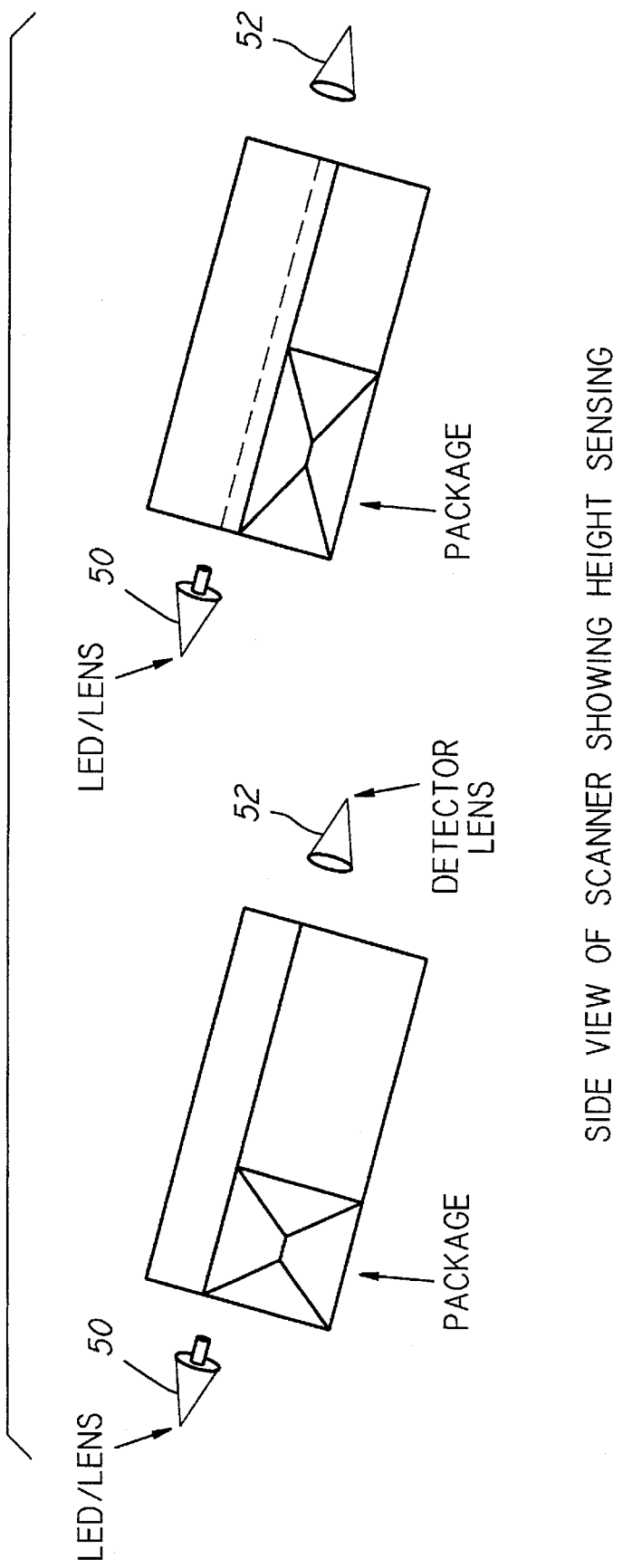
FIG. 5A is a schematic view of the height sensing apparatus to an embodiment of the present invention.

Referring to FIG. 5A, means are provided for automatically establishing the optimal location of the scanning beam waist for resolving a bar code on item surfaces not in contact with either belt. This mechanism is important because the location of the bar code label surface can vary depending upon the size of the package. For example in a typical grocery checkout application, in the height direction, the surface location may vary from 0 to 8 inches. In the width direction, the surface location may vary from 0 to 12 inches. A typical four inch depth of focus as is used in many conventional scanning devices is insufficient to cover this range. In a preferred embodiment, the limiting location of the label surface in the height and width direction is determined by the dimensions of the scanning aperture 14 (FIG. 1) which serves as a rough initial orientation of a package surface to be placed on the transport means 12.

Because the label can be located on any surface, the surfaces not in contact with the belts must be separately scanned. These surfaces not in contact with the orthogonal belts can be at a wide variety of positions and angles. An ideal depth of focus may be established for reading the bar codes of symmetric items on surfaces parallel to the belt surfaces, but not in contact, on items of varying widths and heights. Accordingly, a first laser beam source produces a beam waist sufficiently focused to resolve elements of a bar code of an item greater than a predetermined width. The first laser beam source is focused on half of the volume above the orthogonal belt. A second laser beam source is also focused on the other half of the volume above the orthogonal belts for producing a beam waist sufficiently focused and scanned to resolve elements of a bar code on the surfaces of an object smaller than a predetermined width. A sensor means associated with the first and second laser beam sources is provided for sensing when an item greater than a predetermined width and height is about to be scanned. The sensor means activates the first laser beam source when a large object over the threshold width and height is to be scanned. The sensor means deactivates the first laser beam source and activates the second laser beam source when an object smaller than the threshold size is sensed. Each item surface above the belts is advantageously scanned according to its location. And, because two surfaces of the object being scanned are stably registered by gravity against the supporting surface of orthogonal belts, this aspect establishes an ideal depth of focus for resolving a bar code label of objects of varying size. In a similar manner a third and fourth laser source, disposed orthogonally to the first and second laser sources, scan the front and back surfaces (relative to belt motion) of an item to produce an optimally focused scanning plane. This scanning is done from the top with the beams that scan a pre-set angular range relative to the belt. Since the package is moving toward and away from the respective sets of scan lines, ample time is available for scanning.

In another embodiment, two laser sources may be scanned within the same scanning mirrors in conjunction with two detectors. In this case, the two laser beams produce two beams which are close enough to each other to be scanned by the same mirrored polygon and pattern mirrors, but far enough from each other in angle to be imaged in two different locations by the collection lens. Each beam therefore, has its own waist location and detector. In this method, the beams may be multiplexed with their corresponding detectors for producing a single data stream. Alternatively, the beams may be used simultaneously for producing two data streams. To obtain an increase in the effective depth of focus, the two beams can be focused at different distances.

Scanning will be simplified in comparison to conventional devices and at the same time achieves an optimal alignment of an item bar code label with the scanning lines of a scanning means. This greatly enhances the first pass read rate in comparison with conventional devices. An enhanced accuracy rate is especially possible for items whose bar code labels are parallel or perpendicular to the package edges. Scanning is limited to two directions wherein two surfaces of the item to be scanned are automatically oriented and in focus at a predetermined plane for enabling the scanning bars of a bar code label to optimally read by a bar code scanner. Sensing the package cross-section perpendicular to the package motion also enables the depth of focus of the scanning beams to be optimized. This configuration further enhances the cost effectiveness, speed and accuracy of scanning items at a retail point of sale or the like. The need for a checker at a point of sale may be eliminated, thereby providing a primary economic motivation for the implementation of the present system.

Figure 6A:
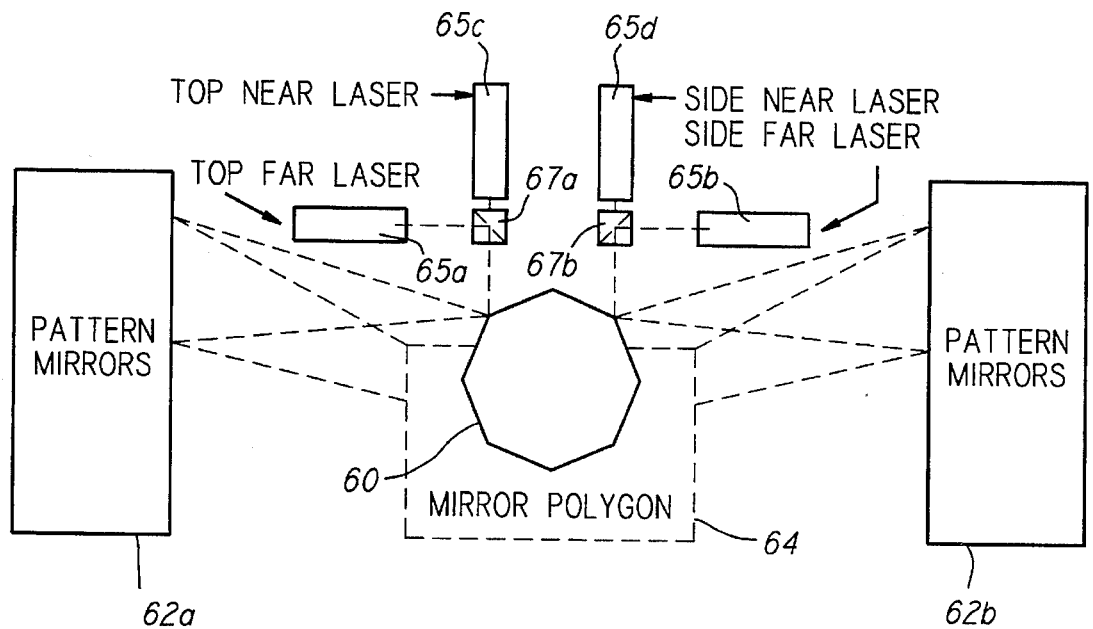
FIG. 6A is a top plan view of one system for generating a scanning pattern for scanning the non-belt contacting sides of the package generally parallel to the belts' surfaces.

To insure a useful scanning spot size over the approximate eight inch depth, a measuring light beam is projected across the aperture to a detector as shown in FIG. 5A. The projector 50 consists preferably of an LED and a lens. The detector 52 consists of a lens and a photodetector. The measuring light beam determines if the height of a package is greater or less than a predetermined height, for example four inches. The required laser module (e.g. far lasers 65a, 65b and near lasers 65c, 65d as shown in FIG. 6A) is then turned on as needed. The two polarized beams are combined within a respective polarizing cube 67a, 67b, consequently there is no power loss. Since the laser beams are aligned, the detector is always in the correct position. A first laser beam source (either far laser 65a or 65b) produces a beam waist sufficiently focused to scan and resolve a bar code of an item greater than a predetermined size, for example a height of four inches. A second laser beam source (either near laser 65c or 65d) produces a beam waist sufficiently focused to scan and resolve a bar code of an object smaller than a predetermined size.

The optical projector and detector 50, 52, respectively, of FIG. 5A comprise sensor means which are associated in accordance with well known techniques with the first and second laser beam sources. The LED projector 50 and detector 52 are coupled with the laser beam sources for activating the first beam source when an item greater than a predetermined size is sensed (the beam from 50 does not reach detector 52). The sensor means then activate the second beam source when an object smaller than a predetermined size is sensed. This aspect optimizes the depth of focus for resolving bar code labels on objects of different sizes. This feature combines with other aspects to provide a very high first pass read rate of bar code labels.

Figure 5B:
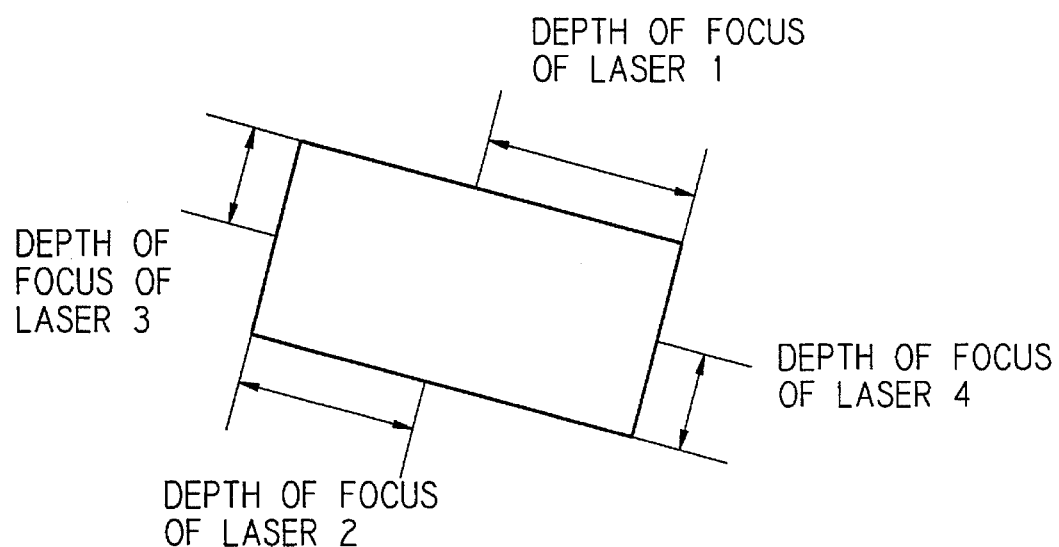
FIG. 5B is a schematic view of height and width sensing in accordance with an embodiment of the present invention.

As shown in FIG. 5B, a third and fourth laser source are provided for scanning the height as well as the width of the front and back of a package. Thus, the focal planes of the scanning lines are optimized for height as well as width.

It will be appreciated that the foregoing technique may be used in a similar manner in the 12 inch direction wherein the depth of focus must be extended from four inches to six inches. This can be accomplished by using a larger spot size and higher laser power in accordance with well known techniques.

Figure 5C:
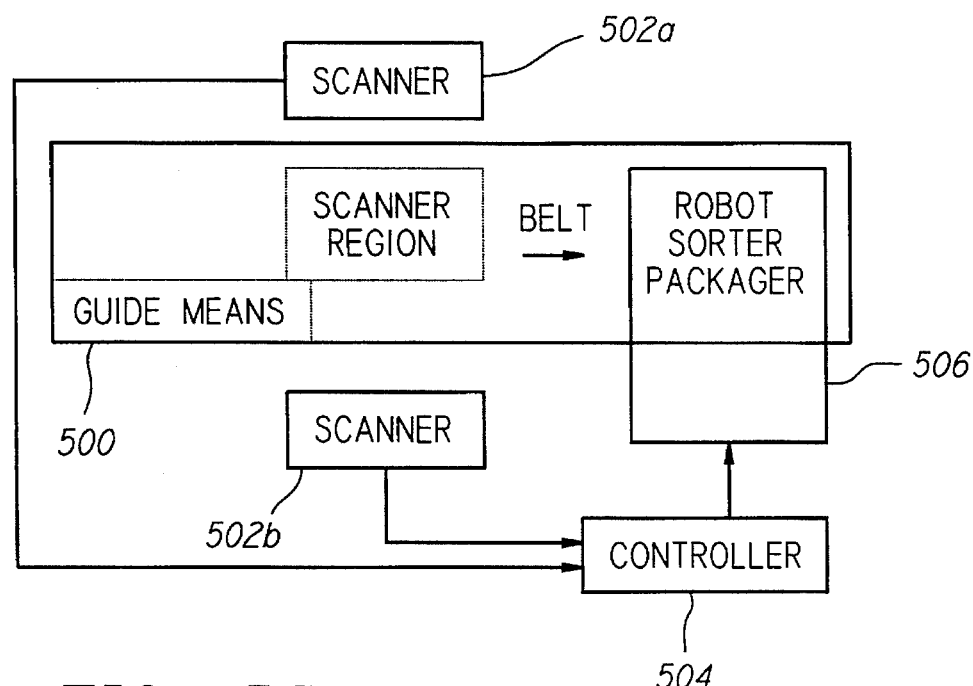
FIG. 5C is a schematic view of a robot sorter and packager.

According to another embodiment, the foregoing features make possible the implementation of a fully automated, servo-controlled robot packaging system for sorting, bagging, or packaging items according to their size, weight or other desired parameters. Referring to FIG. 5C, items are placed upon a belt 1 where they are preferentially positioned by a guide means 500 so as to be in an optimal focal plane for scanning by a bar code scanning means as previously explained. Guide means 500 may be a platen or an orthogonally disposed moving belt as set forth above. The items then move along the item path defined by the belt 1 through a scanning region 4. Scanners 502a and 502b scan the items in the scanning region in accordance with well-known techniques as previously explained. The scanners 502a and 502b resolve the bar code labels as described above, and in accordance with well known techniques, produce a decoding signal representative of the information contained in the bar code label. Preferably, scanners 502a and 502b include means for sensing dimensional parameters of an item which are necessary for facilitating packaging and bagging, such as height, width, weight, or the like.

The controller means 504 is responsive to the decoding signals containing the bar code information and dimensional data of items being scanned. The controller means 504 in turn activates a robot sorter means 506 which sorts and packages each of the items in accordance with the information derived from the respective bar code label from that item. The controller means 504 is also responsive to signals from an item gate (not shown) and takes into account the belt speed to activate the robot sorter means 506 at the appropriate time as the item moves along the item path in accordance with well-known techniques. The robot sorter means then sorts each item according to size and weight and bags or otherwise appropriately packages the item.

Figure 6B:
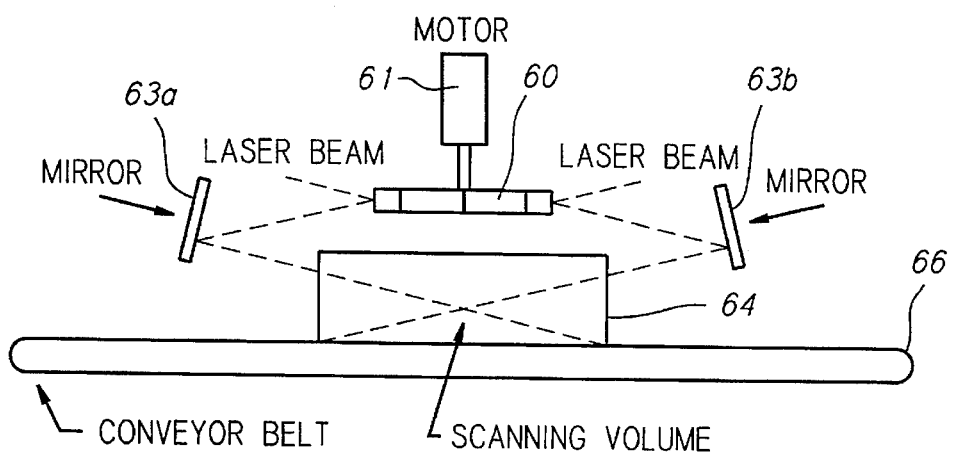
FIG. 6B is a schematic side view of another system of generating a scanning pattern for scanning the front and back faces of the package.

Referring now to FIGS. 6A and 6B, another embodiment provides a single multi-faceted mirror polygon 60 for generating at least two scan patterns for scanning the surface of a package from different directions (in the illustrated embodiment, opposite directions are illustrated) in accordance with a predetermined locus of positions which define an optimal scanning plane congruent with the surfaces of the package registered to the belts.

Referring to FIGS. 6A and 6B, the multiple lasers (65a–d) provide for multiple waist distances and multiple scan directions operating off the same rotating mirror polygon 60. Top far laser 65a and top near laser 65c (focused at respective far and near distances) each produces a laser beam which passes through the polarizing cube 67a, and is directed off one side of the mirror polygon 60 which scans the beams across the pattern mirrors 62a. Similarly, the side far laser 65b and side near laser 65d (focused at respective far and near distances) each produces a laser beam which passes through the polarizing cube 67b, and is directed off another side of the mirror polygon 60 which scans the beams across the pattern mirrors 62b.

In a preferred embodiment, the optimal scan patterns are generated with a single eight-sided mirror polygon 60 with each mirror facet tipped at a desired angle in accordance with well known techniques. Pattern mirrors 62a, 62b similar to those used on the bottom and side scanners may be used on the top and free side. A desired number of scan lines, for example eight scan lines, reflect off five long mirrors and thereby create 40 scan lines. The single scanning means (shown in this example as mirror polygon 60) can be used to scan two (or more) sides of the item through both sides of the titled belt conveyor (see FIG. 2). Other arrangements of pattern mirrors well known in the industry can be used to scan these faces. The scanning mirror 60, in combination with other features described, ensures that the focal plane of a laser scanner is automatically aligned in a coplanar relation with respect to a surface of the item to be scanned. In addition, a single decoding means could decode the return signal from both scan patterns. The decoding means is typically a conventional decoding circuit which is well known in the art.

The same mirror polygon 60 can be used to scan both free end faces of a package on the titled belt conveyor system. As shown in FIG. 6B, the laser beams reflect off the mirror polygon 60 and pattern mirrors 63a and 63b respectively, to produce the scanning volume 64 along the conveyor belt 66 as shown. The scanning volume 64 contains the surfaces of the item to be scanned which is registered in a predetermined location on the conveyor belt 66 as previously explained. The laser modules and pattern mirrors of FIG. 6A are not shown in 6B.

Referring to FIG. 6B, the scan pattern is relatively simple to generate because the package is moving in the direction to bring the beam in and out of focus. At a belt speed of eight inches per second, a four inch depth of focus allows ½ second of time for scanning. Because both surfaces of the object which are registered to the orthogonally disposed belts are scanned at the same time, this arrangement allows sufficient time for both the front and back package faces to be adequately scanned.

The system described uses several lasers and scan pattern generators, modules and multiple sets of front-end electronics. There are many streams of data to be analyzed. The decoding may be consolidated into two or perhaps one decoder board. Schemes well known in the art can be used to produce a unique, unambiguous decoder signal for each item scanned.

Figure 6C:
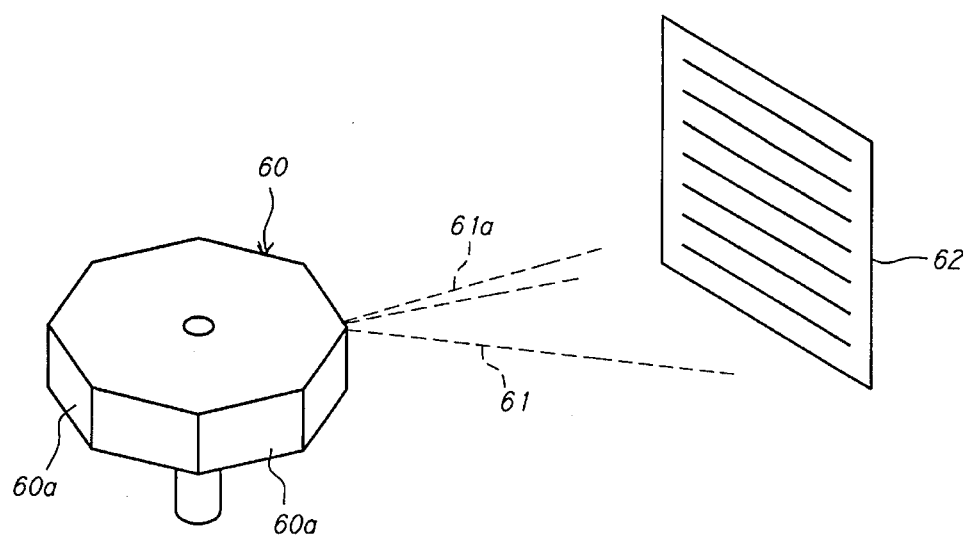
FIG. 6C is a perspective view showing a first arrangement for generating slot specific lines.
Figure 6D:
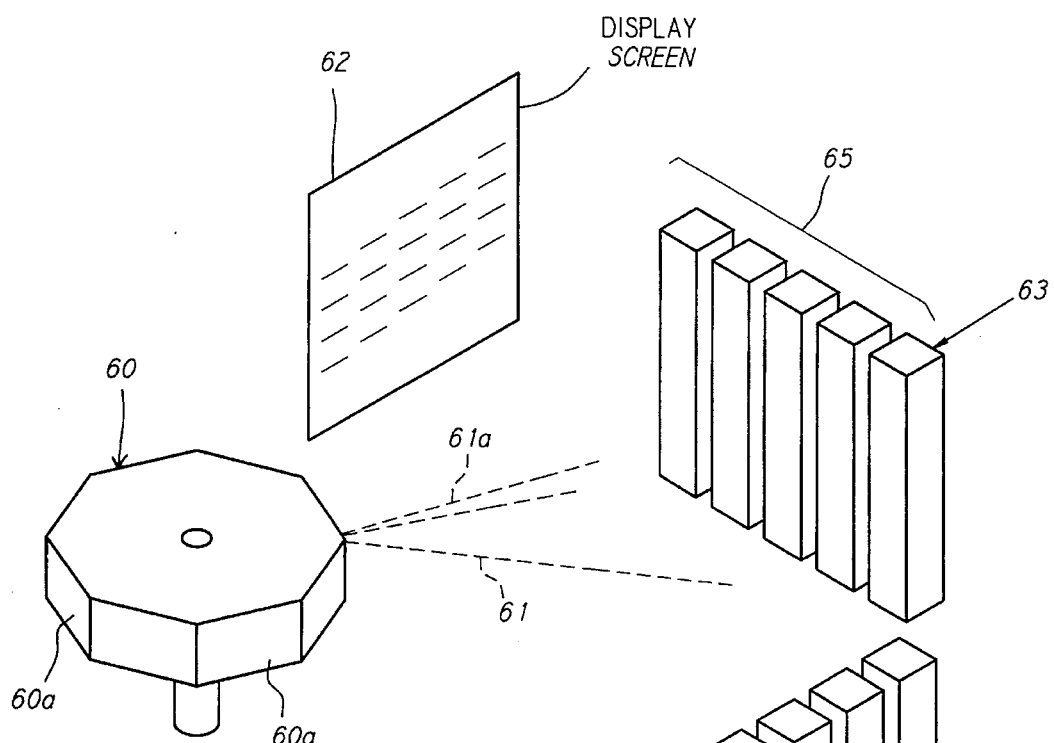
FIG. 6D is a perspective view showing another arrangement for generating slot specific lines.

FIGS. 6C and 6D show the preferred method for generating the slot-specific scanning lines. The faces of the mirror polygon 60 in 6C can each be set at a different angle relative to the axis of the motor and rotated about a circumference producing an array of parallel lines shown on the display screen. This screen 62 is used for the purpose of description only and does not exist in the scanner.

In FIG. 6D, the laser module generates a beam 61 being directed onto mirrored polygon 60 having a plurality of mirror facets 60a, 60a to form the scanning beams 61a. Each mirror 63 and subsequent mirrors forming the pattern mirror array 65 are tilted slightly to segment the scan lines and to direct them to the slots between the belts. The other scan lines required are generated using scan lines which miss mirrors 65 and strike other mirrors (not shown) using techniques which are well known in the industry.

Thus, it can be seen that slot-specific scan lines are produced initially by a reflection from a mirrored polygon 60 having a predetermined number (N) of facets, and secondly by a reflection from an array of mirrors 65, wherein the number of mirrors in the array may be designated by M. This arrangement will produce M times N lines which are substantially parallel, but which are spaced apart from one another. The space between the scan lines may be selected by tilting the polygon facets of the mirror polygon 60 and the mirrors of the array 65.

Figure 6E:
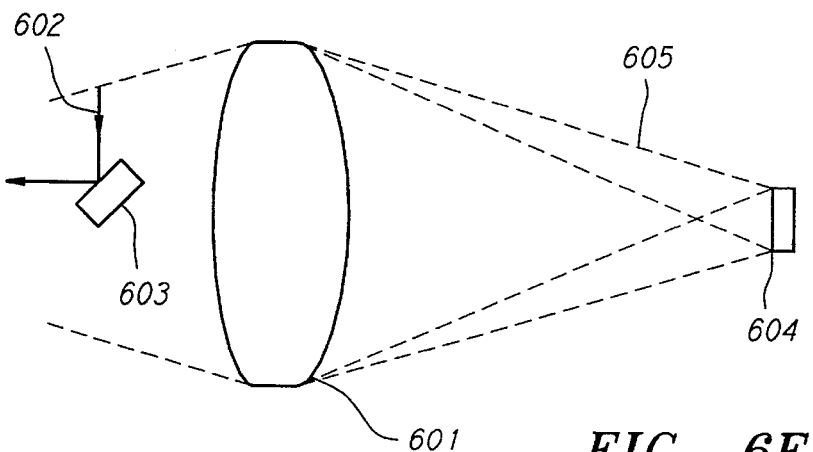
FIG. 6E is a schematic drawing of a conventional means for retro-directive collection in conventional bar codes scanners.
Figure 6F:
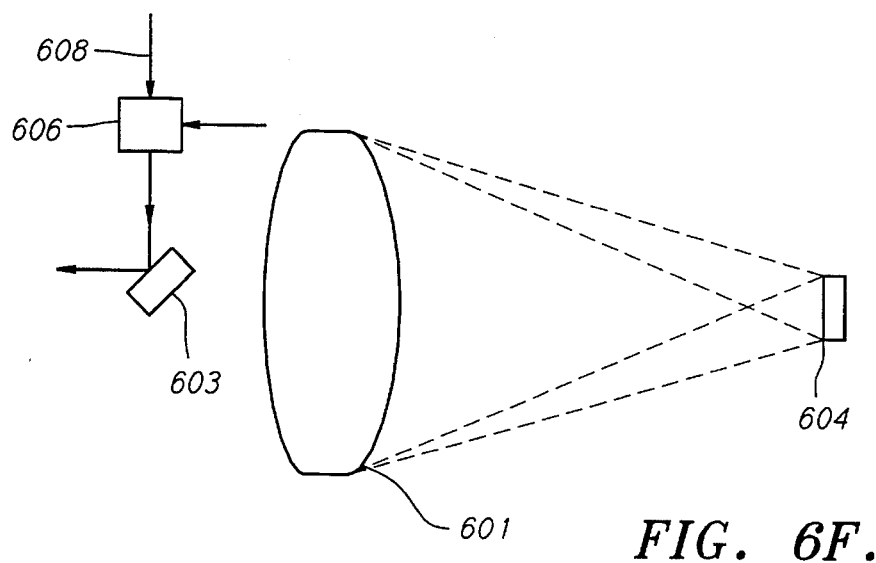
FIG. 6F is a schematic drawing of the light collection method with the depth of focus enhancement method.
Figure 6G:
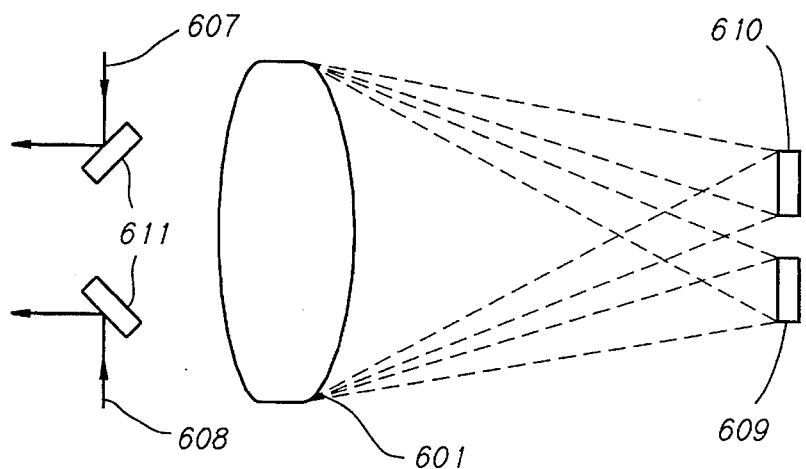
FIG. 6G is a schematic drawing of the light collection method using two laser sources in the same scanning system.

FIGS. 6E, 6F and 6G show details of three reflected light collection systems. In the conventional system shown in FIG. 6E, the input laser beam 602 is reflected along the axis of a lens 601 and through the optical system by the small mirror 603. A portion of the light reflected by the label is imaged by the lens 601 onto the detector 604. The angular orientation of the outgoing laser is such that the spot is always imaged on the detector.

In FIG. 6F polarized laser sources 607 and 608 are combined with substantially no loss in the polarizing beam splitter 606. To ensure that the light reflected from the label is imaged onto the same detector, the two laser beams must be substantially parallel to each other. In this embodiment, the appropriate laser beam is switched on by the item sizing sensing method described with respect to FIG. 5.

FIG. 6G shows the detail of a further embodiment in which two laser beams can be used alternately or simultaneously. Each laser beam 607 and 608 is reflected generally along the axis of the lens 601 by mirrors 611. The angular separation of the beams is small enough that the beams are both contained within the scanning mirrors yet they are separated with respect to their angles far enough to be detected by the two separate detectors 609 and 610. This configuration advantageously allows scanning of a greater volume with multiple depths of focus, without the need for a beam splitter. For example, one beam may have a depth of focus in a range of from 10–12 inches, while the other beam may have a depth of focus of 12–14 inches.

Figure 6H:
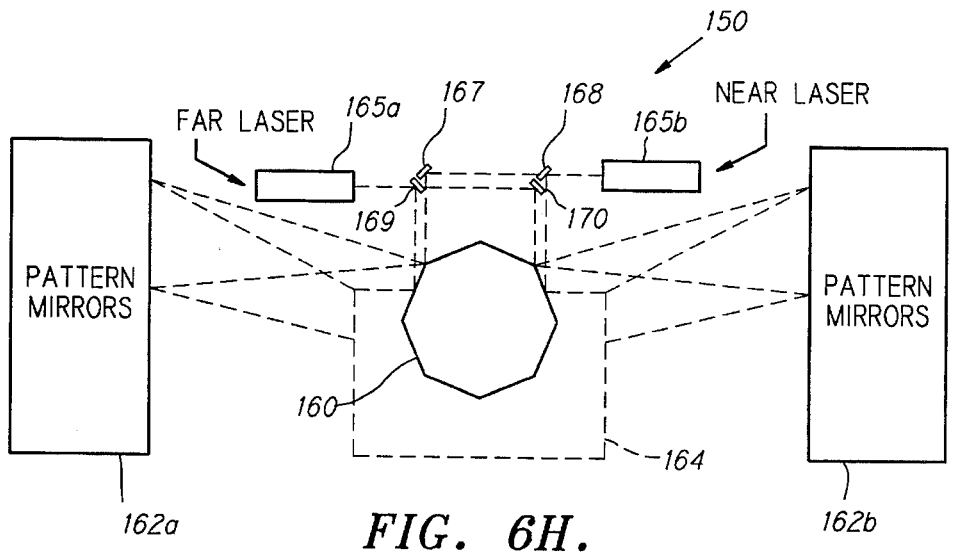
FIG. 6H is a top plan view of an alternate embodiment to the system of FIG. 6A which generates multiple scanning patterns and multiple distances.

FIG. 6H illustrates an alternate embodiment to the multiple scanning direction, multiple focus distance system of FIG. 6A. In the system 150 of FIG. 6H, only two lasers are used, far laser 165a providing the further distant waist location and near laser 165b providing the nearer distant waist location. The far laser 165a generates a laser beam toward a beam splitter 169 which splits the beam into two components, a first portion of the beam being directed to a first side of the mirror polygon 160 and a second portion of the beam being directed to a fold mirror 170 which reflects it onto a second side of the mirror polygon. Similarly, the near laser 165b generates a laser beam toward a beam splitter 168 which splits the beam into two components, a first portion of the beam being directed to the second side of the mirror polygon 160 and a second portion of the beam being directed to a fold mirror 167 which reflects it onto the first side of the mirror polygon 160. The mirror polygon 160 scans the first portion of the far laser beam and the second portion of the near laser beam off of the pattern mirrors 162a while simultaneously scanning the second portion of the far laser beam and the first portion of the near laser beam off of the pattern mirrors 162b and creating a desired pattern of intersecting lines (or non-intersecting lines if desired) into the scanning volume.

Figure 6I:
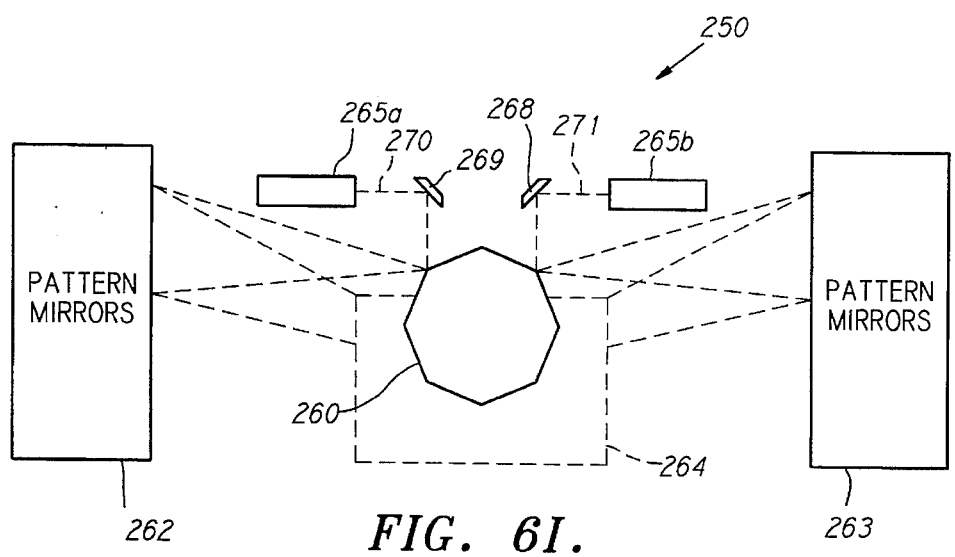
FIG. 6I is a schematic top plan view of a simplified version of the system of FIG. 6A which generates multiple scanning patterns.
Figure 6J:
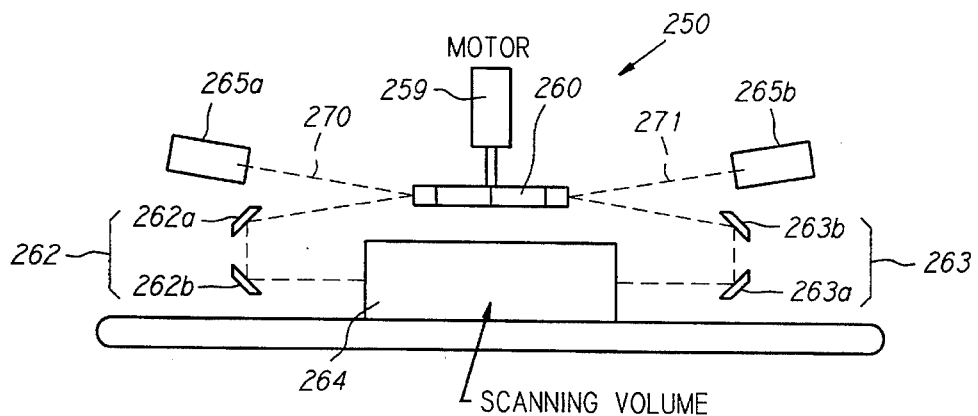
FIG. 6J is a schematic side view of the system of FIG. 6I.

FIGS. 6I and 6J illustrate a simplified embodiment of the system of FIG. 6A only including multidirection scanning. The system 250 of FIGS. 6I and 6J uses a single scanning means comprised of a mirror polygon 260 rotatably driven by a motor 259. The system 250 includes a first laser beam 270 generated by a first laser source 265a and a second laser beam 271 generated by a second laser source 265a. The first and second laser beams are directed onto the mirror polygon in a plane perpendicular to an axis of rotation of the mirror polygon. The first laser beam 270 is reflected off a fold mirror 267 and off a first side of the mirror polygon 260 and scanned across the pattern mirrors 262. FIG. 6J illustrates one pair of mirrors 262a and 262b (there would of course preferably be a pattern mirror or pattern mirror combination for each facet of the mirror polygon 260) which operate together to direct the first beam 270 into the scan volume 264. In similar fashion, the second laser beam 271 is reflected off fold mirror 268 and off a second side of the mirror polygon 260 and scanned across the pattern mirrors 263. FIG. 6J illustrates one pair of mirrors 263a and 263b which operate together to direct the second beam 271 into the scan volume 264. One skilled in the art may design a desired angles of mirror facets of the mirror polygon 260 and the angles and locations of the pattern mirrors 262, 263 to achieve the desired scan pattern within the scan volume 264.

Figure 6K:
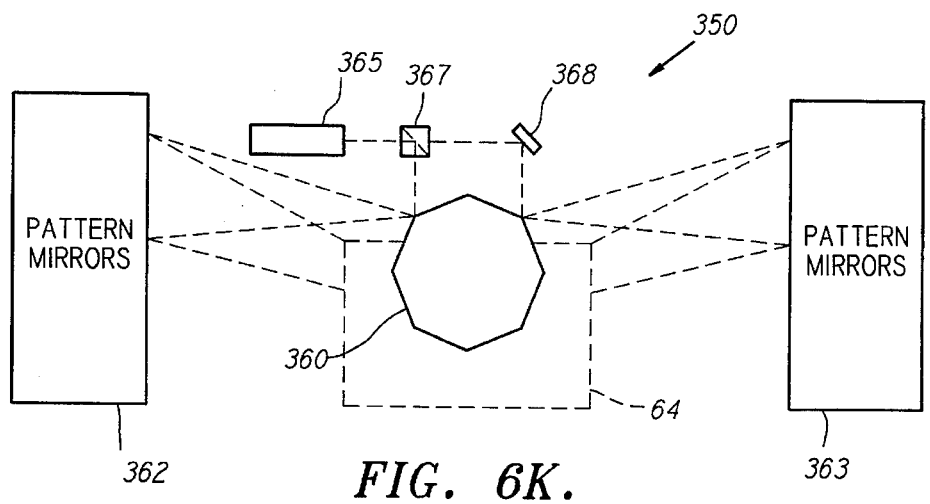
FIG. 6K is a schematic top plan view of another simplified version of the system of FIG. 6A which generates multiple scanning patterns.
Figure 6L:
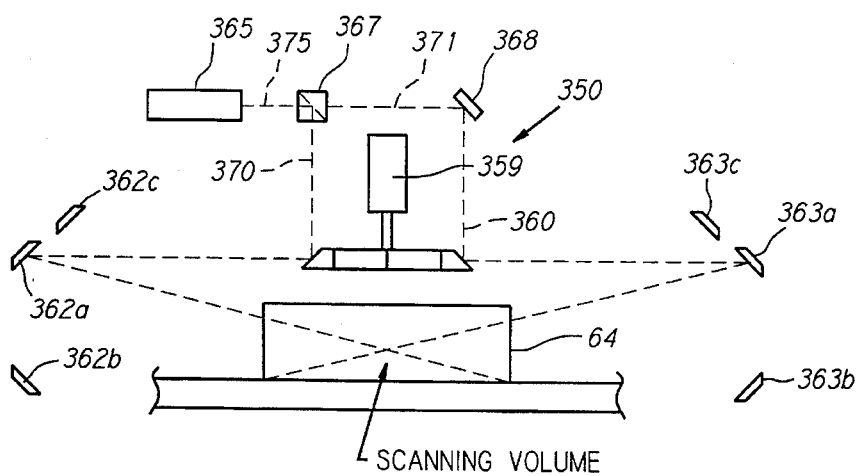
FIG. 6L is a schematic side view of the system of FIG. 6K.

FIGS. 6K and 6L illustrate another simplified embodiment of the system of FIG. 6A. The system 350 of FIGS. 6K and 6L uses a single scanning means comprised of a mirror polygon 360 rotatably driven by a motor 359. The system 350 includes a first and second laser beams 370, 371 generated by a single laser source 365. The laser source 365 generates a laser beam 375 which is divided by a beam splitter 367 into the first and second laser beams 370, 371. The first laser beam 370 is reflected off a first side of the mirror polygon 360 and scanned across the pattern mirror set 362. FIG. 6L illustrates a single pattern mirror 362a into the scan volume 364. Scanning beams from different facets of the mirror polygon 360 would reflect off the other pattern mirrors 362b, 362c. In similar fashion, the second laser beam 371 is reflected off a fold mirror 368 and off a second side of the mirror polygon 360 and scanned across the pattern mirror set 363. FIG. 6J illustrates one pair of mirrors 263a and 263b which operate together to direct the second beam 271 into the scan volume 264. One skilled in the art may design a desired angles of mirror facets of the mirror polygon 360 and the angles and locations of the sets of pattern mirrors 362, 363 to achieve the desired scan pattern within the scan volume 364.

Figure 6M:
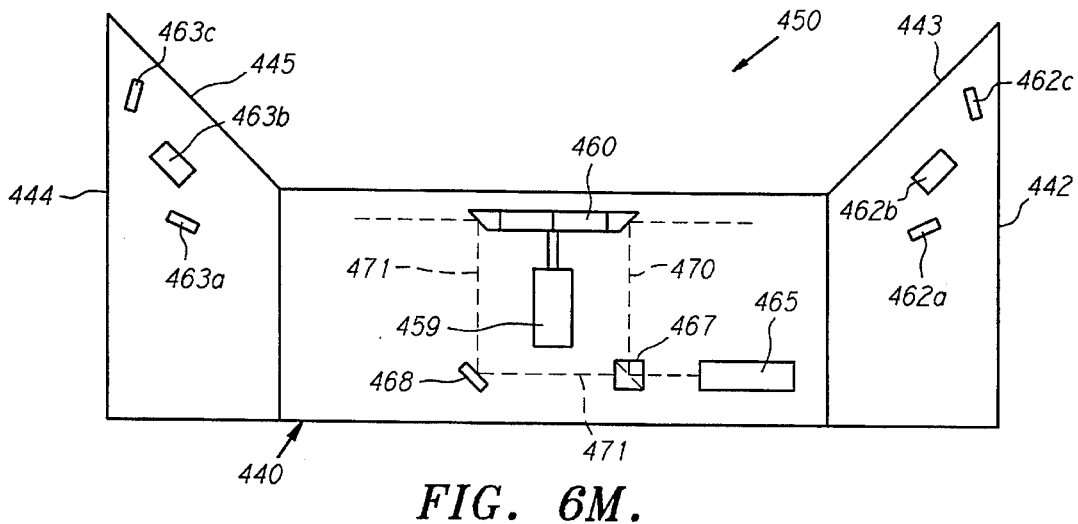
FIG. 6M is a diagrammatic view of the system of FIGS. 6K and 6L positioned in the housing of FIG. 2.
Figure 7A:
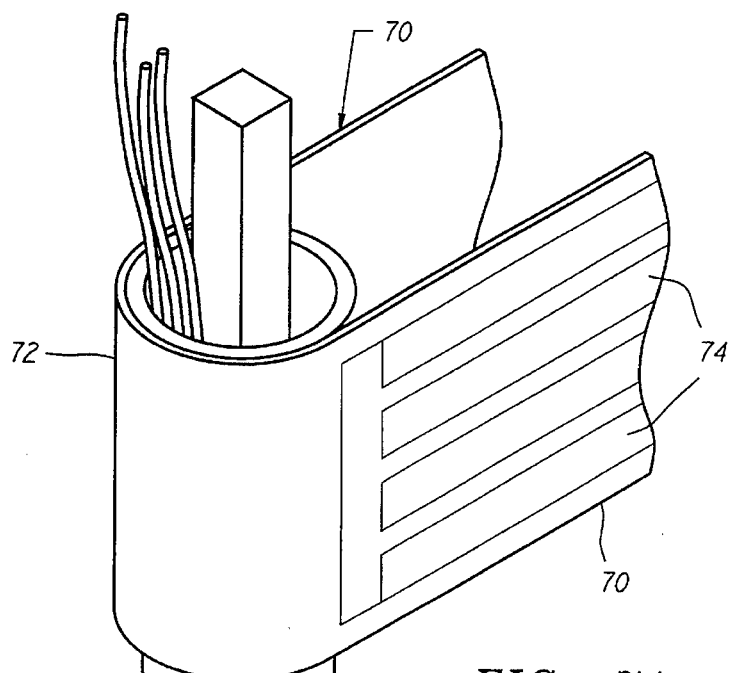
Figure 7C:
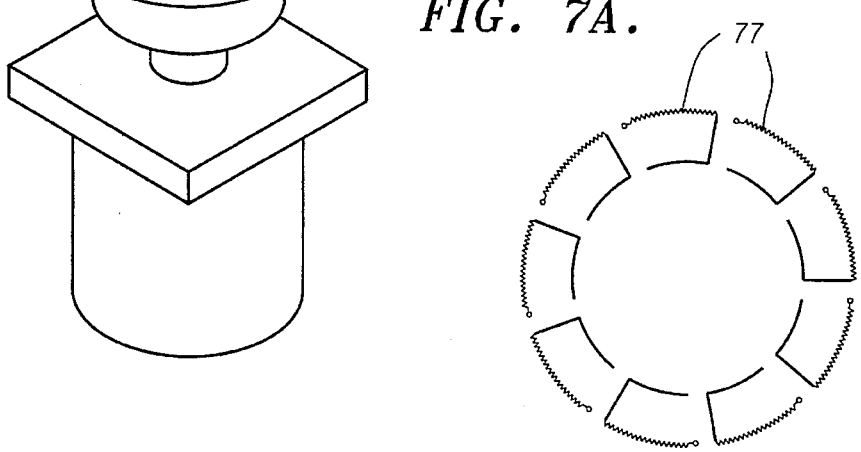
FIG. 7C is a detail of the circuit for the heating roller of FIG. 7B.
Figure 7B:
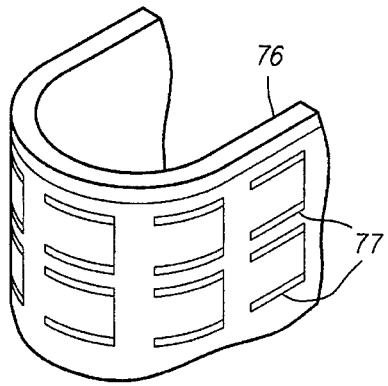
FIG. 7B is a detail of the heating roller of FIG. 7A.
Figure 7D:
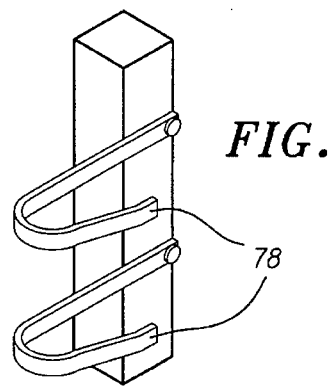
FIG. 7D is a detail of the circuit for the heating roller of FIG. 7A.

FIG. 6M illustrates one possible multiplanar scanning system 450 in which the scanning system 350 of FIGS. 6K–6L is disposed in the housing of FIG. 2. The elements of the scanning system are located in a central section of the housing 440 with the first set of pattern mirrors 462a–c being located in a first side housing portion 442 and the second set of pattern mirrors 463a–c being located in a second side housing portion 444. The system 450 uses a single scanning means comprised of a mirror polygon 460 rotatably driven by a motor 459. The system 450 includes a first and second laser beams 470, 471 generated by a single laser source 465. The laser source 465 generates a laser beam which is divided by a beam splitter 467 into the first and second laser beams 470, 471. The first laser beam 470 is reflected off a first side of the mirror polygon 460 and scanned across the first set of pattern mirrors 462a–c and out the window 443 into the scan volume. The second laser beam 471 reflects off a fold mirror 468 is reflected off a second side of the mirror polygon 460 and scanned across the second set of pattern mirrors 463a–c and out the window 445 into the scan volume. It may be noted that the windows 443 and 445 are arranged generally orthogonally to allow for full scan coverage of the item being scanned.

Referring to FIGS. 2 and 6M, the first window 443 is oriented orthogonally to the second window 445. And though these figures illustrate each of the surfaces being inclined at about 45° from the horizontal, it is preferred that each surface is oriented at least 30° above horizontal, preferably maintaining the 90° relationship therebetween.

In accordance with another preferred embodiment, a display means is provided which is responsive to the output signal of a scanning means for providing a concurrently moving display of data relating to the item being scanned. The display means comprises an alphanumeric display (and/ or graphical display such as descriptive or pictorial) positioned preferably along the conveyor belt or at any convenient location for displaying the price and other data directly next to the item being purchased. The display is preferably located proximate the item path so that the user may readily associate the display data with the item being moved down the item path. Referring again to FIG. 1, as an item moves down the transport belt 1, the price and name or other related data moves concurrently with the item in a display 5. This advantageously enables a customer to see what he is being charged for the item as it is moving down the belt. To be most useful, a long display (about four feet) with two rows of characters may be needed. Other messages to the customer also may be communicated with such a display.

Several display technologies are appropriate for this purpose. They include light emitting diodes (LEDs) and liquid crystal displays (LCDs). An LED array may be programmed to move the alphanumeric data at the belt speed and in alignment with the item being decoded. Preferably, the display is located near the belt so that the customer is provided with an instantaneous alphanumeric display of data corresponding to each item being scanned. However, LED and conventional LCD displays may be expensive to use in such an application. The lower cost LCD display also may be too slow for high belt speed and may necessitate a slower than optimal transport speed for the transport means.

Therefore, in a preferred embodiment, a sheet or belt of material capable of changing color upon application of a predetermined source of synergistic stimulation is used to provide an alphanumeric display along the conveyor belt. For example, a sheet of thermochromic material, capable of changing color upon the selective application of elevated temperature in a predetermined range may be used. Preferably, the sheet or belt of thermochromic material is coextensive with and driven by the same transport means which conveys the items along the item path. In one embodiment, a thermochromic material is contained in a sheet and changes color from black to bright blue when the surface is heated to about 40° to 45° C. To form a display, the surface of the sheet is selectively heated to form letters and numbers. Referring to FIGS. 7A–7D, a belt of thermochromic material 70 is supported on a roller 72 for coextensive movement with the transport means (not shown). The display material may be, for example, any material capable of changing color in response to heat or to an applied electric current. The heating surface 76 comprises an array of heating elements 77 disposed circumferentially around the roller. The heating elements 77 may be selectively activated by pulsing an electric current through brushes 78 in accordance with well known techniques. The brushes 78 are responsive to signals from the decoding means which in turn decodes the information supplied by the scanning of the bar code labels.

In accordance with well known techniques, the electric current is selectively pulsed to the brushes 78. The brushes in turn selectively activate heating elements 77 to produce a pattern or visual display image of data associated with each item being scanned. It will be appreciated that the thermochromic material is capable of holding an alphanumeric or other image display upon heating for a predetermined amount of time without the need for being refreshed. Upon cooling, the thermochromic material simply reverts to its original color and is ready to be heated again to produce a visual display of data representative of each successive item being scanned by the scanning means 88a.

Figure 8A:
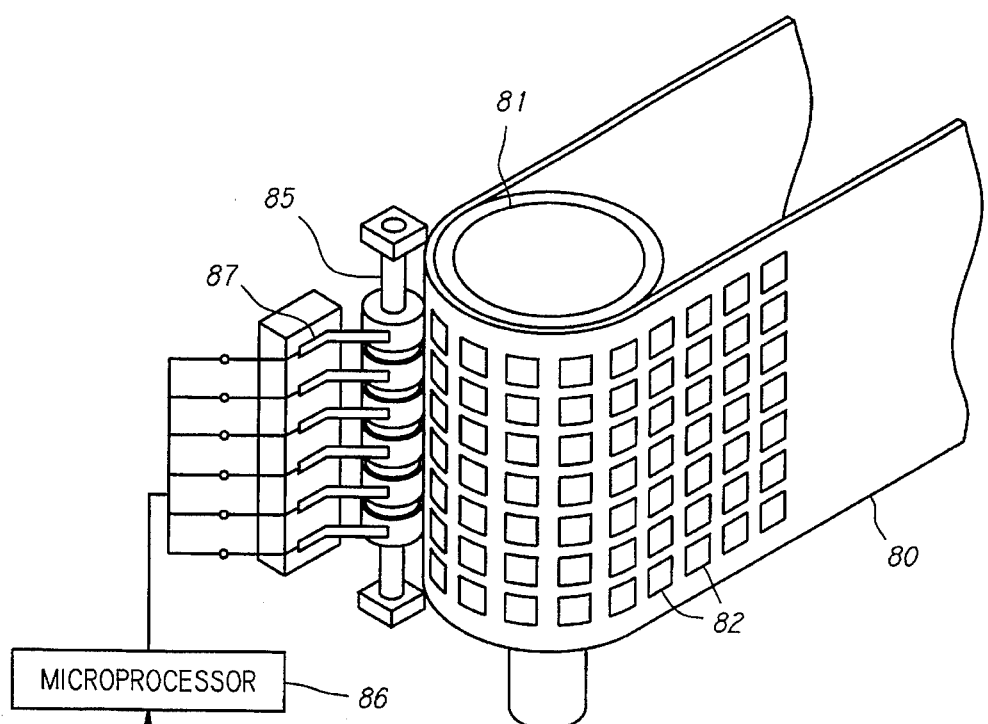
FIG. 8A is a perspective view of an apparatus for activating a pattern of pixels for creating a display image.

An alternative embodiment of a display means is shown in FIG. 8A. A sheet or belt of liquid crystal material, such as noematic curvilinear aligned phase material (NCAP) 80 is supportably moved by a roller 81. The NCAP material is currently manufactured by at least three companies, Raychem, Taliq and Optical Shutters. Roller 81 moves the display provided by liquid crystal material 80 such that as the item moves down the conveyor belt, the price and item name also are displayed on the sheet of liquid crystal material 80 and move with the item allowing the customer to see a description of the item and what amount is being charged for the item.

The sheet of liquid crystal material 80 includes on the front thereof, an array of pixel elements 82 or other display means for creating a visual pattern or alphanumeric image. An array of pixel elements 82 comprise electrodes which effect the change in transmission of light and consequently effect a change of color in the liquid crystal material 80. As shown in FIG. 8A, each row of pixel elements or electrodes 82 of the array of pixel elements is disposed for contacting a corresponding activating means 84. In a preferred embodiment, the activating means comprises a series of cylinders or rollers 84. The rollers 84 are disposed on a single shaft 85 for contacting the liquid crystal material 80. Each roller 84 is in turn selectively activated by microprocessor 86 through an array of brushes 87 in accordance with well known techniques. The microprocessor 86 is responsive to a decoder 88 which decodes the information on the bar code label being scanned by the scanning means. As each roller 84 is selectively activated, it receives an applied electric current, and in turn, applies an electric charge to a corresponding one or more contacting pixel elements 82 in order to form a display image.

A suitable electrically activated liquid crystal material for application is sold under the trademark VARILITE, manufactured by Taliq Corporation of Sunnyvale, Calif., a subsidiary of Raychem. VARILITE or NCAP technology is based on the fact that the liquid crystals' molecules orient themselves systematically with an electric charge and randomly without a charge, thereby selectively changing their ability to diffuse the transmission of light.

Figure 8B:
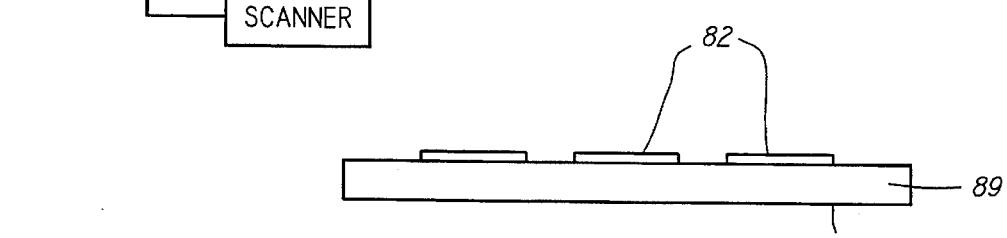
FIG. 8B is a schematic diagram of NCAP liquid crystal display film.
Figure 8C:
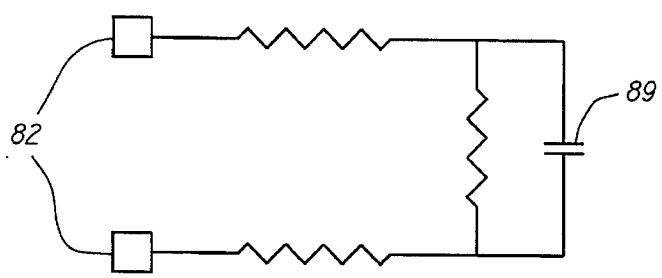
FIG. 8C is a schematic circuit diagram for the LCD film of FIG. 8B.

Referring to FIGS. 8B and 8C, the pixel elements 82 change their structural domains in response to an applied voltage, and thereby change color to form an alphanumeric display. A typical RC circuit for activating the pixel elements is also shown in FIG. 8C. In this embodiment, pixel elements 82 represent an array of electrodes on the control electrode side of the film 80. A capacitance is formed by the individual electrodes 82, an intermediate dielectric material 89 and a common conductor 90 as shown. This forms a basic RC circuit. The resistances $R_1$ and $R_2$ are inherent in the area of the film between the electrodes 82. The values of the resistances $R_1$ and $R_2$ may be adjusted by selectively doping the material 80 in accordance with well known techniques. Making the value of $R_2$ smaller through deficient doping allows a longer time constant. The RC circuit is activated by a signal from microprocessor 86 in response to decoding signals from the decoder 88.

For example, once scanned and decoded, the item bar code information is collected by a point of sale unit and the item description and price are determined in accordance with well known techniques. The description and price information are applied to a microprocessor means which in turn activates the display device to produce the desired display such as item description and price.

The display means of this embodiment provides an advantage over conventional methods, such as an itemized listing, because the visual imagery is composed for easy understanding (and may be in any language). The data display also moves along with the item on the belt and therefore optimizes customer interpretation and provides minimum reading error. As shown in FIG. 1, the display mechanism 5 visually displays an item description "CAKE MIX" and the price "1.25". The data display (of item description "CAKE MIX" and the price "1.25") moves in unison with the item $I_1$ on the conveyor belt $C_1$. Not only does this coordinated motion facilitate customer verification, but security is facilitated allowing store personnel to readily monitor checkout to ensure that the products are properly scanned and recorded. The data display may be alphanumeric (e.g. "CAKE MIX" and price as in FIG. 1) or graphical such as a pictorial representation of the item scanned. Such pictorial confirmation is readily assimilated by the user.

The moving display is also advantageous over conventional itemized lists because it presents information within a fraction of a second from the time that an item is scanned and continuously holds that information for the customer, providing more time to read the data.

While the present invention has been described in connection with what is presently considered to be the most practical and preferred embodiments, it is to be understood that the invention is not limited to the disclosed embodiment but, on the contrary, is intended to cover various modifications and equivalent arrangements included within the spirit and scope of the appended claims. For example, with regard to the moving display, a microprocessor may selectively activate certain brushes which in turn activate selected heated zones to form a pattern on a thermochromic material in accordance with decoding signals. Also, the display elements may be either passive electrochromic devices which modulate ambient light in response to decoding signals from the bar code scanners, or may be elements which actively emit light and change color in response to an applied decoding signal such as an array of light emitting diodes. However, in such a structure the display apparatus is movably coupled to the transport belt to provide a moving display of the item as it moves along the belt. Therefore, persons of ordinary skill in this field are to understand that all such equivalent structures are to be included within the scope of the following claims.

What is claimed is:

1. A bar code scanning system for scanning items being passed through a scan volume, comprising a conveyor for moving items through the scan volume, the conveyor defining a first surface;

a second surface disposed adjacent the first surface and arranged generally orthogonally thereto;

a first set of pattern mirrors positioned adjacent the first surface;

a second set of pattern mirrors positioned adjacent the second surface;

a mirror polygon for generating scanning beams to be passed through the first surface and the second surface; and a motor for rotating the mirror polygon, wherein scanning beams are passed through the conveyor for scanning a surface on an item in contact therewith.

2. A bar code scanning system according to claim 1 further comprising a source for producing first and second laser beams, the first laser beam being directed onto a first side of the mirror polygon by which the first laser beam is scanned across the first set of pattern mirrors and reflected out through the first surface, the second laser beam being directed onto a second side of the mirror polygon by which the second laser beam is scanned across the second set of pattern mirrors and reflected out the second surface.

3. A bar code scanning system according to claim 2 wherein the source comprises a laser module producing a primary laser beam and a beam splitter which divides the primary laser beam for producing the first and second laser beams.

4. A bar code scanning system according to claim 1 wherein the conveyor has a top surface tipped at an angle above horizontal such that items placed thereon slide down due to gravity into contact with the second surface.

5. A bar code scanning system according to claim 2 wherein the conveyor comprises a belt of transparent scratch resistant material.

6. A bar code scanning system according to claim 2 wherein the second surface comprises a conveyor through which scanning beams are passed.

7. A bar code scanning system according to claim 1 wherein the second surface comprises a platen through which scanning beams are passed.

8. A bar code scanning system according to claim 7 wherein the platen is comprised of a slick material having a low coefficient of friction.

9. A bar code scanning system according to claim 1 wherein the scanning beams passing through the first surface comprise a plurality of scan lines running parallel to a moving direction of the conveyor and a transverse scan line running perpendicular to the conveyor.

10. A bar code scanning system according to claim 1 wherein the first surface comprises a transparent plate of scratch resistant glass.

11. A bar code scanning system according to claim 1 wherein the second surface comprises a transparent plate of scratch resistant glass.

12. A bar code scanning system according to claim 1 wherein scanning beams are formed from a laser beam directed onto the mirror polygon in a plane perpendicular to an axis of rotation of the mirror polygon.

13. A method of scanning items comprising the steps of:

providing a conveyor defining a first surface;

providing a second surface arranged generally orthogonally to the first surface and forming a scan volume therebetween;

moving items through the scan volume on the conveyor;

producing a plurality of scanning beams by reflecting laser light off a single multi-faceted mirror polygon located below the conveyor;

directing some of the scanning beams off a first set of pattern mirrors and out the first surface through the conveyor and into the scan volume;

directing some of the scanning beams off a second set of pattern mirrors and out the second surface and into the scan volume.

14. A method of scanning items according to claim 13 further comprising tilting the conveyor at an angle to horizontal to permit sliding of items by gravity into contact against the second surface.

15. A method of scanning items according to claim 13 further comprising directing a laser beam onto the mirror polygon in a plane perpendicular to an axis of rotation of the mirror polygon.

16. A method of scanning items according to claim 13 further comprising producing first and second laser beams;

directing the first laser beam onto a first side of the mirror polygon by which the first laser beam is scanned across the first set of pattern mirrors and reflected out through the first surface;

directing the second laser beam onto a second side of the mirror polygon by which the second laser beam is scanned across the second set of pattern mirrors and reflected out the second surface.

17. A method of scanning items according to claim 13 further comprising producing the first and second laser beams by splitting a primary laser beam from a single laser module with a beam splitter.

* * * * *